(12) United States Patent
Liebau et al.

(10) Patent No.: US 9,334,750 B2
(45) Date of Patent: May 10, 2016

(54) CONTROL OF LOAD REJECTION

(75) Inventors: Martin Liebau, Baden (CH); Peter Marx, Birmenstorf (CH); Sami Hashmi, Kilwangen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 884 days.

(21) Appl. No.: 13/589,263

(22) Filed: Aug. 20, 2012

(65) Prior Publication Data

US 2013/0043680 A1 Feb. 21, 2013

(30) Foreign Application Priority Data

Aug. 19, 2011 (EP) ..................................... 11178186

(51) Int. Cl.
*F01D 17/10* (2006.01)
*F01D 21/14* (2006.01)
*F02C 9/18* (2006.01)

(52) U.S. Cl.
CPC .............. *F01D 17/105* (2013.01); *F01D 21/14* (2013.01); *F02C 9/18* (2013.01); *F05D 2270/56* (2013.01)

(58) Field of Classification Search
CPC ....... F01D 17/04; F01D 17/105; F01D 21/00; F01D 21/14; F02C 6/08; F02C 9/18
See application file for complete search history.

(56) References Cited

U.S. PATENT DOCUMENTS

| | | | |
|---|---|---|---|
| 5,309,707 A | 5/1994 | Provol et al. | |
| 6,364,602 B1 | 4/2002 | Andrew et al. | |
| 6,442,941 B1 * | 9/2002 | Anand et al. | 60/772 |
| 8,015,826 B2 * | 9/2011 | Myers et al. | 60/785 |
| 8,677,761 B2 * | 3/2014 | Leach et al. | 60/779 |
| 2004/0103666 A1 | 6/2004 | Jonsson et al. | |
| 2014/0072399 A1 * | 3/2014 | Maldonado et al. | 415/1 |

FOREIGN PATENT DOCUMENTS

| | | |
|---|---|---|
| EP | 1174606 A2 | 1/2002 |
| WO | WO 0204797 A1 | 1/2002 |

OTHER PUBLICATIONS

European Patent Office, Extended European Search Report in European Patent Application No. 11178186.0 (Jan. 9, 2012).

* cited by examiner

*Primary Examiner* — Arun Goyal
(74) *Attorney, Agent, or Firm* — Buchanan Ingersoll & Rooney PC

(57) ABSTRACT

A control system is provided for a power generating system having a gas turbine, a flue gas exhaust stage and a blow-off valve assembly. The gas turbine includes a compression stage, a combustion stage and a driveshaft. The blow-off valve assembly is configured to selectively provide fluid communication between the combustion stage and the flue gas exhaust stage. The control system includes a controller configured to output a signal causing the blow-off valve assembly to provide the fluid communication in response to a sudden de-loading of the gas turbine.

16 Claims, 1 Drawing Sheet

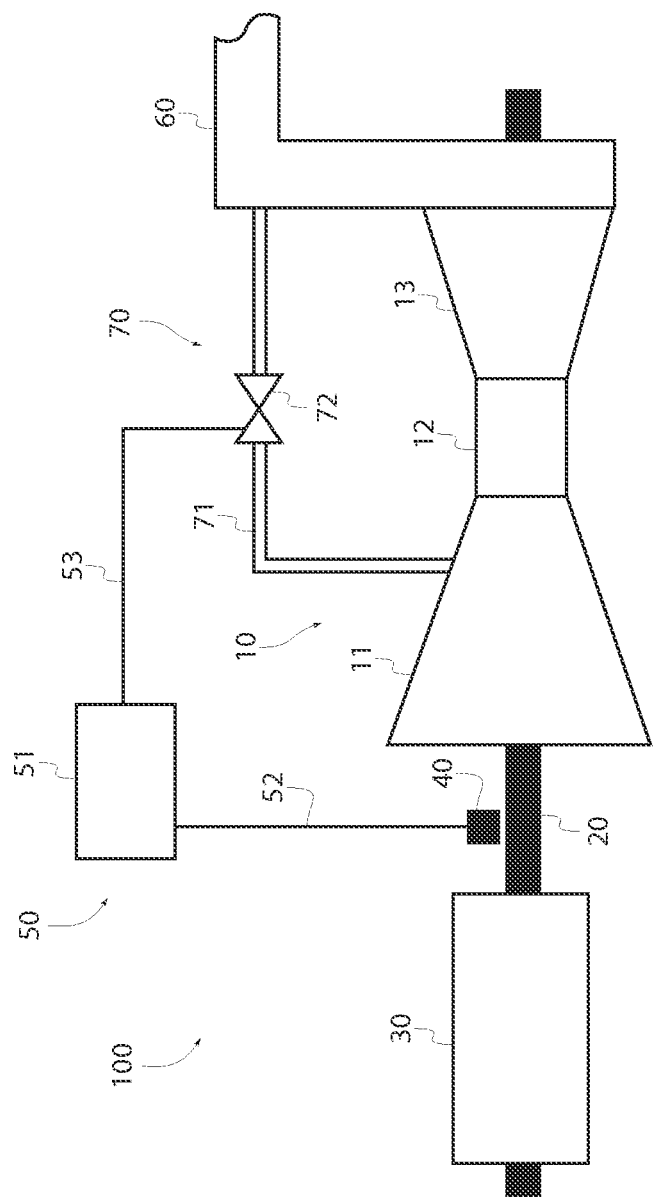

CONTROL OF LOAD REJECTION

CROSS-REFERENCE TO PRIOR APPLICATION

Priority is claimed to European Patent Application No. EP 11178186.0, filed on Aug. 19, 2011, the entire disclosure of which is hereby incorporated by reference herein.

FIELD

The present invention relates to a control system for a power generating system having a gas turbine, a flue gas exhaust stage and a blow-off valve assembly, the gas turbine comprising a compression stage, a combustion stage and a driveshaft, the blow-off valve assembly selectively providing fluid communication between the combustion stage and the flue gas exhaust stage.

BACKGROUND

Power generating systems having a gas turbine are widely known. Such power generating systems are used not only for generating electrical power, but also for providing mechanical power, e.g. for driving ships and vehicles.

A typical gas turbine comprises a compression stage, a combustion stage and an expansion stage. Turbine blades that compress inflowing air in the compression stage are connected by means of a driveshaft to turbine blades in the expansion stage. The compressed air then enters the combustion stage, where it is heated by combustion of fuel. This hot, compressed air then enters the expansion stage, where the hot, compressed air expands and imparts energy onto the turbine blades of the expansion stage. This not only drives the driveshaft for outputting power, but also provides the energy necessary to rotate the turbine blades in the compression stage.

After imparting energy onto the turbine blades in the expansion stage, the hot air, typically denoted as a flue gas due to the presence of combustion byproducts resulting from combustion of the fuel, enters a flue gas exhaust stage where heat may be extracted from the flue gas and/or the flue gas may undergo scrubbing to reduce the number of contaminant particles in the flue gas to prevent them from being released into the atmosphere.

SUMMARY

In an embodiment, the present invention provides a control system for a power generating system having a gas turbine, a flue gas exhaust stage and a blow-off valve assembly. The gas turbine includes a compression stage, a combustion stage and a driveshaft. The blow-off valve assembly is configured to selectively provide fluid communication between the combustion stage and the flue gas exhaust stage. The control system includes a controller configured to output a signal causing the blow-off valve assembly to provide the fluid communication in response to a sudden de-loading of the gas turbine.

BRIEF DESCRIPTION OF THE DRAWING

The present invention will be described in even greater detail below based on the exemplary FIGURE. The invention is not limited to the exemplary embodiment. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a schematic view of a power generating system in accordance with an embodiment of the present invention.

DETAILED DESCRIPTION

The gas turbine may comprise a blow-off system with a valve assembly that selectively provides fluid communication between the compression stage and the flue gas exhaust stage, e.g. for reducing the pressure of the compressed air in the compression stage. Such a reduction of pressure can be useful for alleviating pressure imbalances that arise in some operating conditions, eg. start-up and shut down, which pressure imbalances can "stall" the compression stage.

In an embodiment, the invention extends the application of the blow off system.

In various embodiments, the invention provides means and techniques for stabilizing a flame in a combustion chamber of a gas turbine when the gas turbine undergoes sudden de-loading, e.g. as in the case of load rejection, by controlling the air—fuel ratio.

In accordance with an embodiment of the invention, this is achieved, inter alia, by allowing fluid communication between the compression stage and the flue gas exhaust stage, e.g. via a blow-off valve assembly, when sudden de-loading occurs.

In accordance with an embodiment of the present invention a control system for a power generating system having a gas turbine. The power generating system may be configured to produce electrical or mechanical power via combustion of a fuel in the gas turbine. For example, heat generated by combustion of the fuel may used to impart rotational energy to a driveshaft that drives an electrical generator or provides an output of mechanical power.

The gas turbine may comprise a compression stage, a combustion stage and an expansion stage.

The compression stage may comprise a rotary turbine having a plurality of turbine blades that provide for compression of an inflowing fluid, e.g. air. Furthermore the first compressor stages may compromise variable inlet guide vanes in order to control the amount of air enters the gas turbine. The expansion stage may likewise comprise a rotary turbine having a plurality of turbine blades. The rotary turbine of the compression stage may be connected to the rotary turbine of the expansion stage, e.g. by a driveshaft, in a manner that allows energy imparted into the rotary turbine of the expansion stage to be transferred to the rotary turbine of the compression stage, for example for driving the rotary turbine of the compression stage to provide for compression of the inflowing fluid via rotation of the rotary turbine of the compression stage. In this respect, the turbine blades of the compression stage and/or the turbine blades of the expansion stage may be directly connected to a driveshaft via which the rotary turbines of the expansion and compression stages are connected.

In the combustion stage, the compressed fluid exiting the compression stage is heated by combustion of a fuel, e.g. in a combustion chamber through which the compressed fluid flows. To this aim, the combustion stage may comprise a plurality of nozzles for mixing the fuel with the compressed fluid, e.g. by spraying the fuel into a combustion chamber at high pressure. The combustion of the fuel in the combustion stage may be regulated for the sake of obtaining efficient combustion, e.g. by controlling the amount, the pressure, etc. of the fuel mixed with the compressed fluid. The power generating system may comprise a combustion controller for effecting this controlling as well as one or more sensor devices for sensing operating parameters of the power generating system, e.g. of the fuel, the compressed fluid, the combustion, etc. Such operating parameters may include a temperature, a pressure, etc.

The gas turbine is typically designed such that the compressed fluid that has been heated in the compression stage flows into the expansion stage, where it imparts energy into the rotary turbine of the expansion stage as it undergoes expansion, thus causing the rotary turbine of the expansion stage to rotate. This rotation of the rotary turbine of the expansion stage may be harnessed to provide an output of mechanical power, e.g. for driving an electrical generator.

The power generating system may comprise a flue gas exhaust stage into which the fluid, which is often termed "flue gas" due to its inclusion of combustion byproducts resulting from combustion of the fuel, flows after expending energy in the expansion stage. In the flue gas exhaust stage, heat may be extracted from the flue gas and/or the flue gas may undergo scrubbing to reduce the number of contaminant particles in the flue gas to prevent them from being released into the atmosphere. The flue gas exhaust stage may be directly connected to the expansion stage. In other words, the flue gas may flow directly from the expansion stage, i.e. from the rotary turbine of the expansion stage, into a portion of the flue gas exhaust stage.

The power generating system may comprise a blow-off valve assembly for selectively providing fluid communication between the compression stage and the flue gas exhaust stage. As such, the blow-off valve assembly selectively provides a fluid path that circumvents the combustion stage, i.e. that is separate from and parallel to the aforementioned fluid path through the combustion stage. The blow-off valve assembly may comprise or consist of one of more pipes and one or more valves, all flow of fluid through each of the pipes being selectively blockable by a respective set of the valves. Each conduit formed by the pipes may provide a substantially unimpaired, direct fluid connection, a blocking function of the valves notwithstanding, between either the compression stage and the expansion stage or the compression stage and the fluid gas exhaust stage.

The control system may comprise a controller, e.g. for controlling operation of the blow-off valve assembly, e.g. for signaling the blow-off valve assembly to provide/prevent fluid communication between the compression stage and the flue gas exhaust stage.

For example, the controller may output a control signal to the blow-off valve assembly indicative of a desired operational state of the blow-off valve assembly, e.g. an OPEN-state that provides substantially unimpaired fluid communication between the compression stage and the flue gas exhaust stage, an CLOSED-state that prevents fluid communication between the compression stage and the flue gas exhaust stage or a partially OPEN state that provides partially restricted fluid communication between the compression stage and the flue gas exhaust stage. The control signal may be an acoustic, hydraulic, electromagnetic, optical or other type of signal. The control signal may actuate and/or at least provide the energy necessary to actuate one or more elements of the blow-off valve assembly. The controller may be implemented in hardware and/or software.

The controller may be configured and adapted to signal the blow-off valve assembly to provide fluid communication between the compression stage and the flue gas exhaust stage in response to a sudden de-loading of the gas turbine, e.g. as in the case of load rejection.

In the context of the present disclosure, sudden de-loading may be understood as an at least 10 percent drop in load within a predetermined time period, as an at least 15 percent drop in load within a predetermined time period or an at least 20 percent drop in load within a predetermined time period. The load may be a load applied to the rotary turbine of the expansion stage, a load applied to a driveshaft that interconnects the expansion stage and the compression stage or a load applied to a driveshaft that provides an output, e.g. a primary output, of mechanical power from the gas turbine, for example. The drop in load may be evaluated by comparing the load at the beginning of the predetermined time period to the load at the end of the predetermined time period, e.g. by dividing the load at the end of the predetermined time period by the load at the beginning of the predetermined time period. The drop in load may be evaluated relative to a nominal full load applied to the respective elements of the gas turbine, e.g. by dividing the difference between the highest load within the predetermined time period and the lowest load within the predetermined time period by the respective nominal full load. For example, the drop in load may be evaluated relative to a nominal full load applied to the rotary turbine of the expansion stage, relative to a nominal full load applied to a driveshaft that interconnects the expansion stage and the compression stage or relative to a nominal full load applied to a driveshaft provides an output of mechanical power from the gas turbine. The predetermined time period may be 10 seconds or less, 5 seconds or less, 2 seconds or less or even one second or less.

In the context of the present disclosure, sudden de-loading may also be understood as an at least 10 percent drop in mass flow through the compressor stage within a predetermined time period, an at least 15 percent drop in mass flow through the compressor stage within a predetermined time period or an at least 20 percent drop in mass flow through the compressor stage within a predetermined time period. The expression "mass flow through the compressor stage" may be understood as the mass of the fluid flowing through any cross-section cutting across the entire fluid flow path formed by the compressor stage. The mass flow through the compressor stage may be estimated, e.g. based on a rotational speed of the rotary turbine of the compressor stage or by the position of the variable inlet guide vanes and estimation values obtained by measurement and/or numerical simulation. The drop in mass flow may be evaluated by comparing the mass flow at the beginning of the predetermined time period to the mass flow at the end of the predetermined time period, e.g. by dividing the mass flow at the end of the predetermined time period by the mass flow at the beginning of the predetermined time period. The drop in mass flow may be evaluated relative to a mass flow at nominal full load of the gas turbine, e.g. by dividing the difference between the highest mass flow within the predetermined time period and the lowest mass flow within the predetermined time period by the mass flow at nominal full load of the gas turbine. As above, the predetermined time period may be 10 seconds or less, 5 seconds or less, 2 seconds or less or even one second or less.

In cases where the power generating system comprises an electrical generator driven by the gas turbine, sudden de-loading may be understood as an at least 10 percent drop in electrical power output by the electrical generator within a predetermined time period, as an at least 15 percent drop in electrical power output by the electrical generator within a predetermined time period or an at least 20 percent drop in electrical power output by the electrical generator within a predetermined time period. The drop in electrical power may be evaluated by comparing the output of electrical power at the beginning of the predetermined time period to the output of electrical power at the end of the predetermined time period, e.g. by dividing the output of electrical power at the end of the predetermined time period by the output of electrical power at the beginning of the predetermined time period. The drop in electrical power may be evaluated relative to a nominal maximal steady-state output of the electrical generator, e.g. by dividing the difference between the maximal output of electrical power within the predetermined time period and the minimal output of electrical power within the predetermined time period by the nominal maximal steady-state output. The predetermined time period may be 10 seconds or less, 5 seconds or less, 2 seconds or less or even one second or less.

The controller may be configured and adapted to evaluate, e.g. as described above, whether sudden de-loading has occurred. In this respect, the controller may be configured and adapted to receive load information, e.g. information indicative of a load applied to the rotary turbine of the expansion stage, a load applied to a driveshaft that interconnects the expansion stage and the compression stage or a load applied to a driveshaft that provides an output of mechanical power from the gas turbine, for example. Similarly, the controller may be configured and adapted to receive information indicative of a mass flow through the compressor stage and/or information indicative of the electrical power output by an electrical generator driven by the gas turbine. For evaluating whether a sudden de-loading has occurred, the controller may moreover be configured and adapted to receive measurement values from one or more of the aforementioned sensor devices, the measurement values being indicative of one or more operating parameters of the power generating system, e.g. a current and/or voltage output by the electrical generator, pressure drop in the combustor position of the compressor inlet guide vanes or rotational shaft speed.

While the above disclosure has revolved primarily around a control system, the above disclosure is equally applicable, mutatis mutandis, to a method of operating a power generating system having a gas turbine. Accordingly, an embodiment of the present invention provides a method of operating a power generating system having a gas turbine.

The above disclosure is likewise equally applicable, mutatis mutandis, to a method of modifying a power generating system having a gas turbine. Accordingly, an embodiment of the present invention provides a method of modifying a power generating system having a gas turbine.

The method of modifying a power generating system having a gas turbine may comprise equipping the power generating system with a controller as described above, e.g. a controller configured and adapted to signal a blow-off valve assembly to provide/prevent fluid communication between the compression stage and the flue gas exhaust stage.

The above methods allow an existing power generating system having a gas turbine to be modernized for achieving a stable flame in a combustion chamber of the gas turbine when the gas turbine undergoes sudden de-loading. The equipping may comprise installing a new controller in the power generating system and/or modifying an existing controller to exhibit the described functionality. Latter may entail reprogramming the controller.

The aforementioned methods can be achieved using software. Accordingly, an embodiment of the present invention provides a non-transitory computer-readable storage medium having stored thereon a computer program product that performs any of the aforementioned methods when executed on a computer.

FIG. 1 shows a power generating system 100 in accordance with an embodiment of the present invention.

In the embodiment illustrated in FIG. 1, power generating system 100 comprises a gas turbine 10, a driveshaft 20, an electrical generator 30, a sensor device 40, a control system 50, a flue gas exhaust stage 60 and a blow-off valve assembly 70. Driveshaft 20 may be configured to transmit power output from gas turbine 10 to electrical generator 30. Sensor device 40 may be configured to measure a rotational speed of driveshaft 20. Power generating system 100 may comprise further elements as described above. Moreover, power generating system 100 and its constituent elements may operate as described above.

In the illustrated embodiment, gas turbine 10 comprises a compression stage 11, a combustion stage 12 and an expansion stage 13. Gas turbine 10 may comprise further elements as described above. For example, driveshaft 20 may extend through gas turbine 10 and constitute a connection between a rotary turbine of compression stage 12 and a rotary turbine of expansion stage 13. Moreover, gas turbine 10 and its constituent elements may operate as described above.

In the illustrated embodiment, control system 50 comprises a controller 51, signal lines 52 for communication of signals, e.g. measurement signals, between sensor devices 40 and controller 51 as well as a signal line 53 for communication of signals, e.g. control signals for controlling blow-off valve assembly 70, between controller 51 and blow-off valve assembly 70. Control system 50 may comprise further elements as described above. Moreover, control system 50 and its constituent elements may operate as described above.

In the illustrated embodiment, blow-off valve assembly 70 comprises a pipe 71 and a valve 72. Pipe 71 and valve 72 may operate cooperatively to selectively provide/prevent fluid communication between compression stage 11 and flue gas exhaust stage 60 in response to control signals output from controller 51 and communicated to flue gas exhaust stage 60 via single line 53. Blow-off valve assembly 70 may comprise further elements as described above. Moreover, blow-off valve assembly 70 and its constituent elements may operate as described above.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting.

LIST OF REFERENCE SIGNS

10 Gas turbine
11 Compression stage
12 Combustion stage
13 Expansion stage
20 Driveshaft
30 Electrical generator
40 Sensor devices
50 Control system
51 Controller
52 Signal lines
53 Signal line
60 Flue gas exhaust stage 70 Blow-off valve assembly
71 Pipe
72 Valve
100 Power generating system

What is claimed is:

1. A control system for a power generating system having a gas turbine, a flue gas exhaust stage and a blow-off valve assembly, the gas turbine including a compression stage, a combustion stage and a driveshaft, the blow-off valve assembly being configured to selectively provide fluid communication between the compression stage and the flue gas exhaust stage by bypassing a combustion stage of the gas turbine, the control system comprising:
   a controller configured to output a signal causing the blow-off valve assembly to provide the fluid communication in response to a sudden de-loading of the gas turbine,
   wherein the sudden de-loading is an at least 10 percent drop in mass flow through the compressor within a predetermined time period of less than 5 seconds.

2. The control system according to claim 1, wherein the sudden de-loading further includes an at least 10 percent or at least 15 percent drop in load applied to the driveshaft within a predetermined time period of less than 5 seconds, less than 2 seconds or less than 1 second.

3. The control system according to claim 1, wherein the sudden de-loading is an at least 15 percent drop in the mass flow through the compressor within a predetermined time period of less than 5 seconds, less than 2 seconds, or less than 1 second.

4. The control system according to claim 1, wherein the power generating system includes an electrical generator driven by the driveshaft, and the sudden de-loading further includes an at least 10 percent or at least 15 percent drop in electrical power output by the electrical generator within a predetermined time period of less than 5 seconds, less than 2 seconds or less than 1 second.

5. The control system of claim 1, wherein the gas turbine includes one or more sensors and the control system is configured to receive measurement values from one or more of the aforementioned sensor devices to ascertain whether sudden de-loading of the gas turbine has occurred.

6. A method of operating a power generating system having a gas turbine, a flue gas exhaust stage and a blow-off valve assembly, the gas turbine comprising a compression stage, a combustion stage and a driveshaft, the blow-off valve assembly being configured to selectively provide fluid communication between the compression stage and the flue gas exhaust stage by bypassing a combustion stage of the gas turbine, the method comprising:
   signalling the blow-off valve assembly to provide the fluid communication in response to a sudden de-loading of the gas turbine,
   wherein the sudden de-loading is an at least 10 percent drop in mass flow through the compressor within a predetermined time period of less than 5 seconds.

7. The method according to claim 6, wherein the sudden de-loading further includes an at least 10 percent or at least 15 percent drop in load applied to the driveshaft within a predetermined time period of less than 5 seconds, less than 2 seconds or less than 1 second.

8. The method according to claim 6, wherein the sudden de-loading is an at least 15 percent drop in the mass flow through the compressor within a predetermined time period of less than 5 seconds, less than 2 seconds or less than 1 second.

9. The method according to claim 6, wherein the power generating system includes an electrical generator driven by the driveshaft, and the sudden de-loading further includes an at least 10 percent or at least 15 percent drop in electrical power output by the electrical generator within a predetermined time period of less than 5 seconds, less than 2 seconds or less than 1 second.

10. A method of modifying a power generating system having a gas turbine, a flue gas exhaust stage and a blow-off valve assembly, the gas turbine comprising a compression stage, a combustion stage and a driveshaft, the blow-off valve assembly being configured to selectively provide fluid communication between the compression stage and the flue gas exhaust stage by bypassing a combustion stage of the gas turbine, the method comprising:
   equipping the power generating system with a controller configured to output a signal causing the blow-off valve assembly to provide the fluid communication in response to a sudden de-loading of the gas turbine,
   wherein the sudden de-loading is an at least 10 percent drop in mass flow through the compressor within a predetermined time period of less than 5 seconds.

11. The method according to claim 10, wherein the sudden de-loading further includes an at least 10 percent or at least 15 percent drop in load applied to the driveshaft within a predetermined time period of less than 5 seconds, less than 2 seconds or less than 1 second.

12. The method according to claim 9, wherein the sudden de-loading is an at least 15 percent drop in the mass flow through the compressor within a predetermined time period of less than 5 seconds, less than 2 seconds or less than 1 second.

13. The method according to claim 9, wherein the power generating system comprises an electrical generator driven by the driveshaft, and the sudden de-loading further includes an at least 10 percent or at least 15 percent drop in electrical power output by the electrical generator within a predetermined time period of less than 5 seconds, less than 2 seconds or less than 1 second.

14. A non-transitory computer-readable storage medium having stored thereon a computer program product that, when executed on a computer, causes the computer to output a signal causing a blow-off valve assembly to provide fluid communication between the compression stage of a gas turbine and a flue gas exhaust stage by bypassing a combustion stage of the gas turbine in response to a sudden de-loading of the gas turbine, wherein the sudden de-loading is an at least 10 percent drop in mass flow through the compressor within a predetermined time period of less than 5 seconds.

15. A power generating system comprising:
   a control system according to claim 1, a gas turbine, a flue gas exhaust stage and a blow-off valve assembly, the gas turbine having a compression stage, a combustion stage and a driveshaft, and the blow-off valve assembly being configured to selectively provide fluid communication between the compression stage and the flue gas exhaust stage by bypassing a combustion stage of the gas turbine.

16. The control system of claim 15, wherein the gas turbine includes one or more sensors and the control system is configured to receive measurement values from one or more of the aforementioned sensor devices to ascertain whether sudden de-loading of the gas turbine has occurred.

* * * * *